United States Patent [19]
Bonnemoy

[11] Patent Number: 5,811,770
[45] Date of Patent: Sep. 22, 1998

[54] DEVICE FOR CONDUCTING TRANSACTIONS USING SMART CARDS AND METHOD FOR CONDUCTING A TRANSACTION WITH SAID DEVICE

[75] Inventor: Marc Bonnemoy, Nanterre, France

[73] Assignee: CKD S.A., Nanterre, France

[21] Appl. No.: 403,900

[22] PCT Filed: Sep. 21, 1993

[86] PCT No.: PCT/FR93/00910

§ 371 Date: Jun. 5, 1995

§ 102(e) Date: Jun. 5, 1995

[87] PCT Pub. No.: WO94/07217

PCT Pub. Date: Mar. 31, 1994

[30] Foreign Application Priority Data

Sep. 21, 1992 [FR]  France .................................. 92 11201

[51] Int. Cl.⁶ ................................................... G06K 5/00
[52] U.S. Cl. .......................................... 235/380; 235/486
[58] Field of Search .................................. 235/380, 441, 235/486, 491; 902/5

[56] References Cited

U.S. PATENT DOCUMENTS

| | | | |
|---|---|---|---|
| 4,454,414 | 6/1984 | Benton | 235/380 X |
| 4,569,421 | 2/1986 | Sandstedt | 235/383 X |
| 4,742,351 | 5/1988 | Suzuki | 235/380 X |
| 4,816,655 | 3/1989 | Musyck et al. | 235/380 |
| 4,877,947 | 10/1989 | Mori | 235/381 |
| 5,311,450 | 5/1994 | Ojima | 902/5 |

FOREIGN PATENT DOCUMENTS

| | | | |
|---|---|---|---|
| 0209811 | 1/1987 | European Pat. Off. | 235/380 |
| 0348932 | 1/1990 | European Pat. Off. | 235/493 |
| 0484198 | 5/1992 | European Pat. Off. | |
| 2661762 | 11/1991 | France . | |
| 0206994 | 11/1984 | Japan | 235/380 |
| 8602757 | 5/1986 | WIPO | 235/380 |

*Primary Examiner*—Donald T. Hajec
*Assistant Examiner*—Karl Frech
*Attorney, Agent, or Firm*—Weiser and Associates P.C.

[57] ABSTRACT

A device for conducting monetary transactions with smart cards such as blank cards comprises a housing (120), a coupler (121) for smart cards, a slot (121a) located at the coupler for partial insertion of a smart card, a keypad (122) for the input of at least one confidential code associated with the card inserted into the coupler, and a process for validating the transaction. The slot is adjacent to an edge of the keypad, and the coupler and the slot are positioned so that a portion of the card remaining outside of the housing after partial insertion extends at least partially above the keypad, forming a screen during input of the code to protect confidentiality.

24 Claims, 3 Drawing Sheets

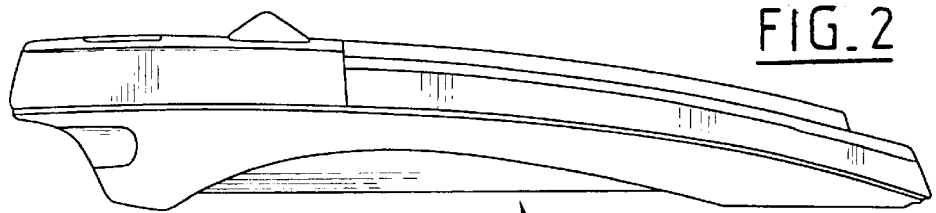
FIG. 2
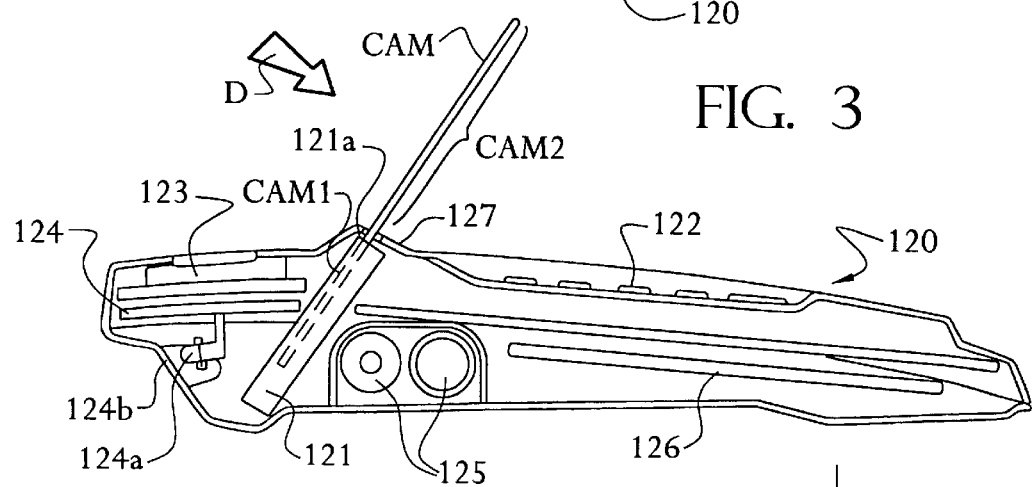
FIG. 3
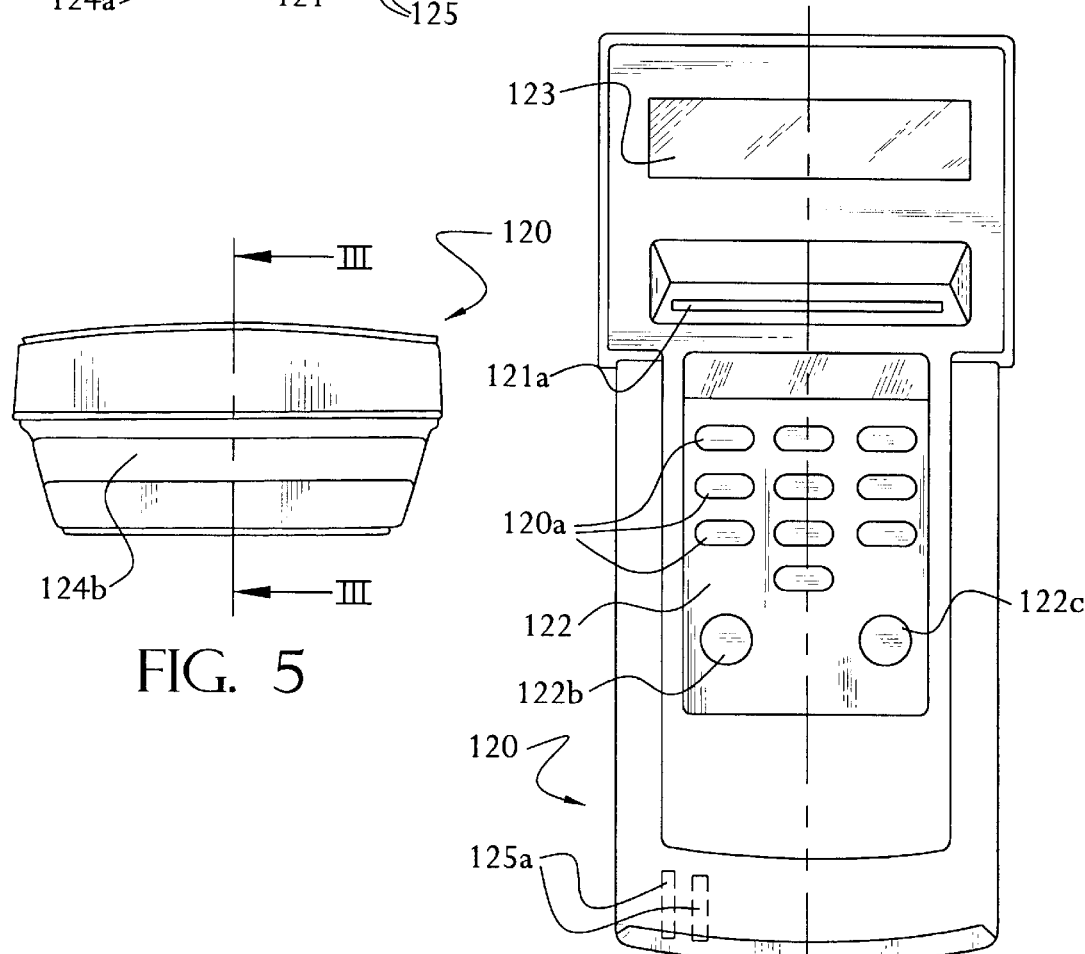
FIG. 5
FIG. 4

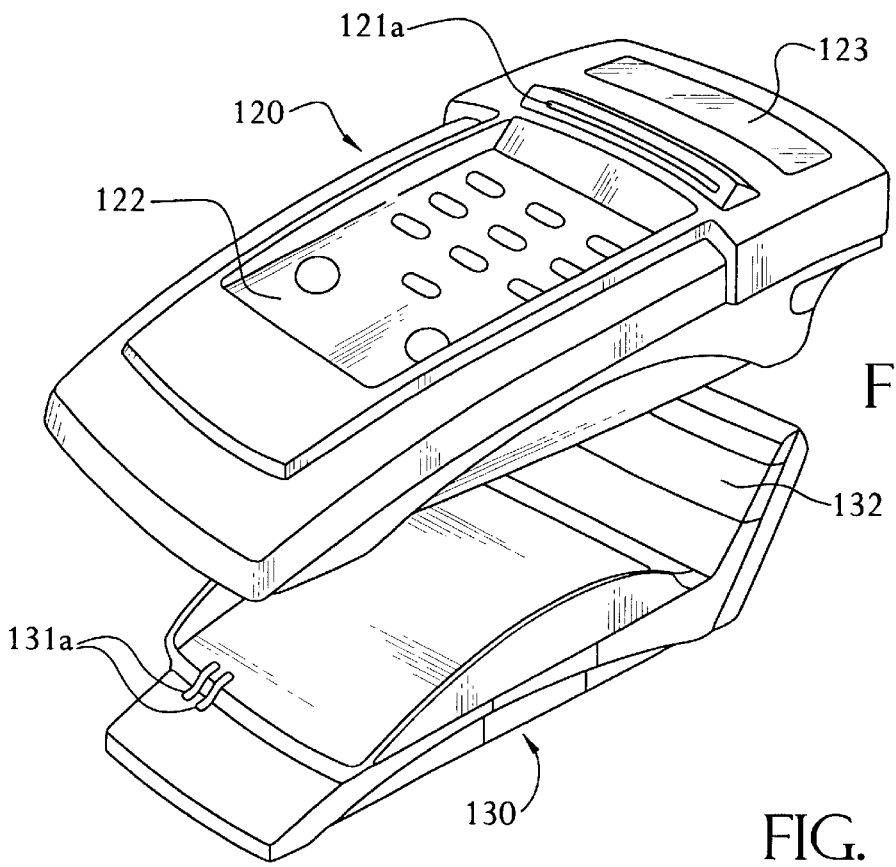
FIG. 6
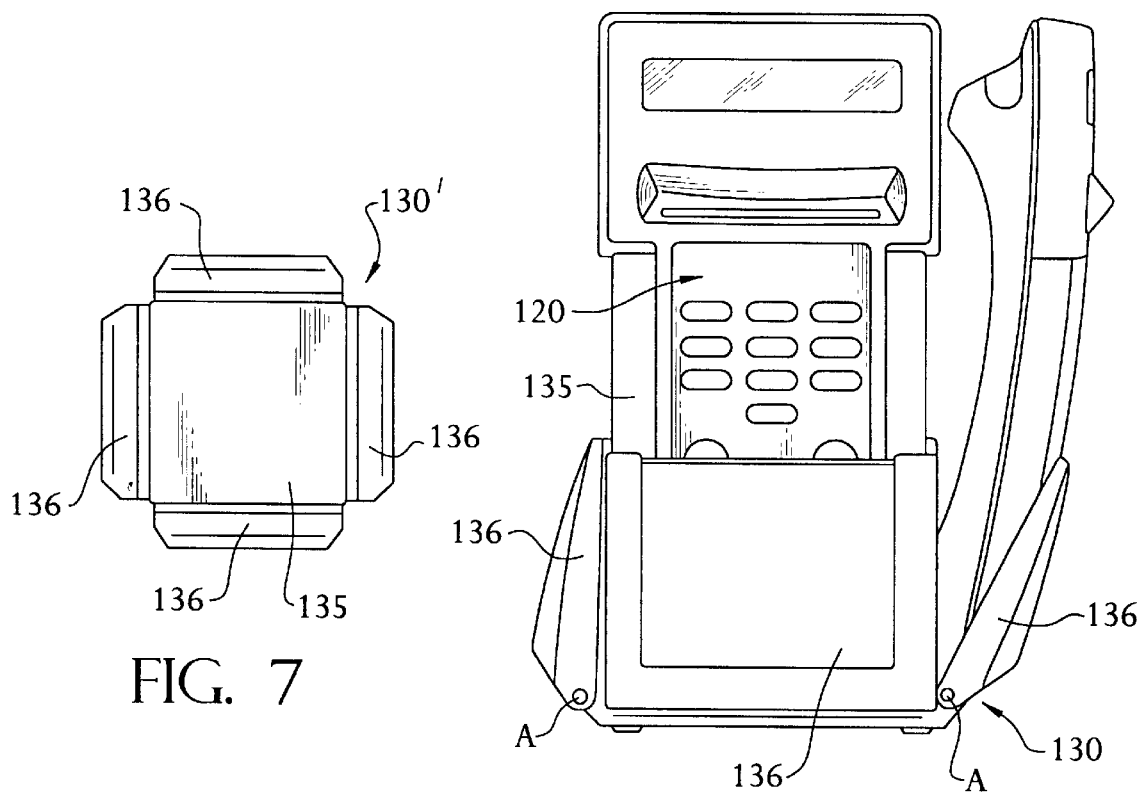
FIG. 7
FIG. 8

DEVICE FOR CONDUCTING TRANSACTIONS USING SMART CARDS AND METHOD FOR CONDUCTING A TRANSACTION WITH SAID DEVICE

BACKGROUND OF THE INVENTION

The present invention generally relates to devices for conducting transactions using smart cards.

As is conventional, a transaction conducted using a smart card involves the following steps:

the smart cart is inserted into a card reader provided in a transaction apparatus, the amount of the transaction is entered by the merchant on a keyboard of the apparatus, the card holder's confidential code is presented to the card and verified by it, and if the identity of the two codes is authenticated, after possible certificate calculation, checking of blacklists, etc., the transaction is validated and a transaction ticket is printed by a printer provided in the apparatus.

A transaction apparatus destined to implement the following steps conventionally exists in the form of a desktop apparatus, powered through a main supply.

In order to facilitate the utilization of such apparatuses, particularly in the restaurant field, apparatuses for transactions using smart cards have been developed in the last several years which are portable, and which include, in one package, the smart card reading device, the keyboard, the printer, and the means for calculation and storage (for example a microcontroller), which are necessary to its operation, the entire assembly being battery powered.

In all applicable cases, the card is placed into the apparatus through a slot which opens onto a appropriate smart card coupler. This slot is generally situated in a front, rear or lateral wall of the package. However, portable apparatuses of this type are relatively heavy and cumbersome, and in practice, an operator such as a server in a restaurant cannot keep the apparatus in a pocket permanently without excessive inconvenience. This bulk is further accentuated when the keyboard of the apparatus is connected to a projecting wall which forms a screen intended for preserving the confidentiality of the code entered on this keyboard by the card holder.

In an attempt to overcome the above mentioned problems of weight and bulk, an apparatus has been developed recently which is separated into two parts, namely a fixed part powered by the main supply which includes part of the processing means and a ticket printer, and a portable part which includes the smart card coupler, a keyboard, and a display. This portable part can come to be physically connected to the fixed part during the transaction so that at least part of the data (amount, card number, etc.) related to this transaction can be transferred to it.

But this apparatus does not make it possible to overcome the disadvantage indicated above regarding confidentiality in entering the code. Furthermore, it can require bringing the portable part, in which the smart card is still in place, out of view of the card holder, resulting in a substantial risk of fraud, inasmuch as the operator would have access to both the card and the confidential code, were he able to observe the card holder entering it on the keyboard.

SUMMARY OF THE INVENTION

It is an object of the present invention to overcome the above-mentioned disadvantages of prior apparatuses for conducting transactions with smart cards, including provisions for confidentiality of the transactions.

To this end, a device is provided for conducting monetary transactions using smart cards such as bank cards, of the type which includes, in one package, a smart card coupler, a slot situated to the right of the coupler for the partial insertion of a smart card, a keyboard for the entry of at least one confidential code associated with a card inserted into the coupler, and means for processing and validating the transaction, characterized in that the slot is disposed adjacent to one edge of the keyboard, and that the coupler and the slot are positioned so that one part of the card, which remains outside the package after the partial insertion, extends substantially perpendicular to the keyboard, forming a barrier against outside observers during the entry of the confidential code.

The device is used by proceeding according to the following steps:

(a) an operator inserts the smart card belonging to a card holder into the coupler of the portable part, (b) the operator enters the amount of the transaction on the keyboard of the portable part, (c) the portable part reads on the smart card the identifier and the confidential code associated with the card, (d) the holder enters a confidential code on the keyboard of the portable part, (e) the smart card verifies the confidential code entered, and the result of this verification is displayed on the display means, (f) if the verification ends favorably, the operator withdraws the card from the coupler and returns it to the holder, (g) the operator brings the portable part to the fixed part, (h) the portable part transmits pieces of information which represent the amount of the transaction entered and at least the identifier of the smart card to the fixed part through emitting and receiving means, (i) the fixed part stores the transaction and prints out a transaction ticket.

Other features, objects and advantages of the present invention will become more apparent from the ensuing detailed description of a preferred embodiment of it, given by way of example and made in reference to the appended drawings.

BRIEF DESCRIPTION OF THE DRAWINGS

FIG. 2 is a side elevation of a portable part of the equipment in FIG. 1.

FIG. 3 is a longitudinal cross-section of the part in FIG. 2.

FIG. 4 is a top view of the part in FIGS. 2 and 3.

FIG. 5 is an end view of the part in FIGS. 2–4.

FIG. 6 is a view in perspective of the part in FIGS. 2–5 and of a first embodiment of another part of the equipment.

FIG. 7 is a top view of a second embodiment of this other part.

FIG. 8 is a side elevation of the part in FIG. 7, receiving several portable parts according to FIGS. 2–5.

It should be noted that, from one figure to another, identical or similar parts or components will be designated by the same reference marks whenever possible.

DETAILED DESCRIPTION OF PREFERRED EMBODIMENTS

Figure 1:
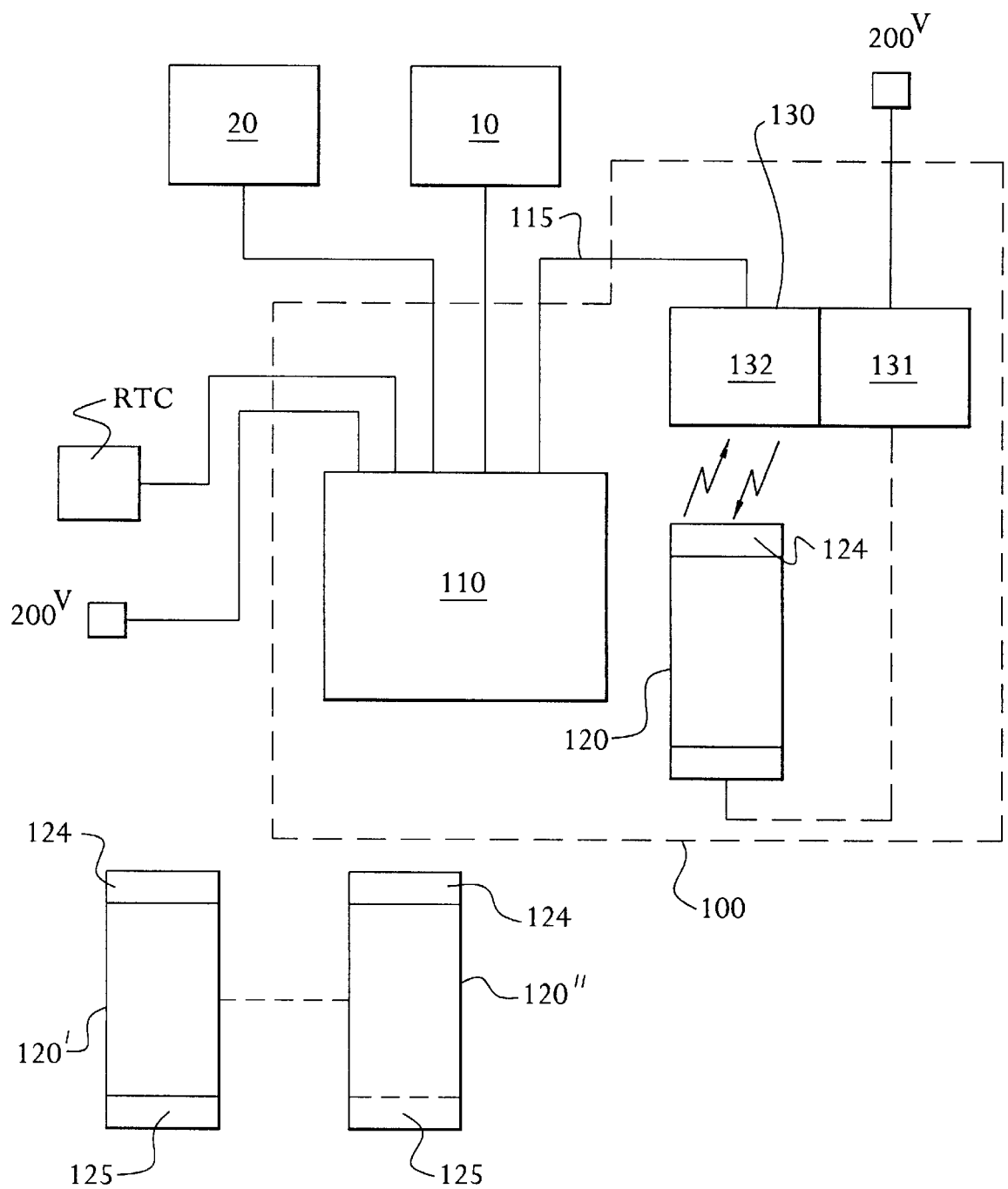
FIG. 1 is a block diagram of a portion of the transaction equipment of the present invention.

FIG. 1 represents a piece of transaction equipment, indicated generally by 100, which is associated with an electronic cash register 10 and a check reading/writing device 20, in a way which is in itself conventional.

The apparatus 100 comprises a fixed part 110 and at least one mobile, portable part or package 120, and preferably a plurality of the packages 120', 120", as illustrated.

Each portable package 120 (represented in more detail in FIGS. 205) includes a smart card coupler 121 intended for cooperating with a smart card (CAM) inserted into a slot 121a of the package. This could be, for example, a coupler in compliance with the specifications of Standard 7816-3, which is available in the trade. The package 120, moreover, supports a keyboard 122 comprising for example twelve keys distributed as follows:

ten numerical keys "0" through "9", at 122a;
  a validation key 122b, which conventionally makes it possible to validate a number (in particular, the amount of the transaction or the confidential code) introduced by the numerical keys 122a; and
  a correction key 122c which makes its possible to correct the number entered in case of error.

Of course, the keyboard 122 can also include any other key that is conventionally used in transaction equipment, particularly a "00" key for the rapid entry of cents, a cancellation key, and a function key.

As will be observed in FIG. 4, the numerical keys 122a are relatively small in size and are grouped on the upper part of the keyboard, while the validation key 122b and correction key 122c are circular keys with larger surfaces disposed on the lower part of the keyboard. This makes number entry operations easier.

This keyboard makes it possible in particular to initialize the electronic circuits of the package 120, to enter a transaction amount, to enter a confidential code and to validate the entries and commands which have been applied to the package, as will be seen in detail later.

The package 120 includes, moreover, a display module 123 conventionally composed of a liquid crystal display (for example, a line of sixteen alphanumerical characters).

A transceiver is provided, such as an infrared emitting/receiving circuit 124 which includes an emitter such as a light emitting diode 124a which emits in the infrared range, and receiver (not represented) such as a phototransistor which is receptive to the infrared range are also found in the package. The diode 124a and the phototransistor are situated to the right of a window 124b which is opaque in the presence of light but transparent in the presence of infrared radiation.

The package also includes batteries 125, preferably in the form of rechargeable accumulators, which make it possible to ensure the electric power supply to these various components. Two electrical connection terminals 125a, disposed for example side by side and flush with the internal surface of the package, allow the package to be connected to a recharging unit, as will be seen later.

Finally, an electronic module 126 is provided in the package 120 which includes, for example, a microcontroller, a read-only memory which contains an operating program, and a read-write memory which is intended for managing operations. This electronic module includes a logic decoding circuit for the keyboard, a control circuit for the liquid crystal display, an interface with the smart card coupler and another interface with the infrared emitting/receiving circuit.

These components are known to the person of ordinary skill in the art and need not be described in any greater detail.

Referring again to FIG. 1, the fixed part 110 of the transaction apparatus 100 itself supports components of a conventional type, particularly a central processing unit associated with read-write memories and read-only memories, an interface (RTC) with the public telephone network or with a telematic network, a printing device intended specifically for printing transaction tickets, a circuit which forms an interface with the electronic cash register 10 and the check reading/writing device 20, means for the processing and storing of data, and a main supply (220 V). The functions of this fixed part will be described later.

An auxiliary device 130, which forms both a recharging unit 131 for the accumulators 125 of the portable part or parts 120 and an infrared signal emitting/receiving device 132 for establishing short-range wireless communication between the fixed part 110 and the portable package or packages 120, is also associated with the fixed part 110. To this end, the auxiliary device 130 is powered by the main supply (220 V) and is linked to the fixed part 110 by an electrical line 115, for example a standard serial digital communication line.

According to one aspect of the present invention, and again in reference to FIGS. 2–5, the smart card coupler 121 and the slot 121a which allows the partial insertion (in a conventional way) of the card CAM, are disposed in the package 120 in such a way that the card CAM, once in place, forms a shield which is intended to diminish the risk of having a third party, specifically the operator of the portable package 120, be able to read the successive depressions of the numerical keys on the keyboard which indicate the confidential code entered by the holder of the card CAM during a transaction.

More precisely, a smart card is inserted into the coupler 121 only partially (the part CAM1), and approximately two thirds to three quarters of the length of the card (the part CAM2) remains outside the coupler. The slot 121a is disposed along the edge of the keyboard 122 which is furthest away from the user (the "rear" edge in the description), whereas the coupler 121 and the slot 121a are positioned in such a way that, when a card CAM is inserted, its exterior part CAM2 comes to be placed essentially perpendicular to the keyboard 122 (see FIG. 3). In this way, the keyboard 122 is at least partially hidden by the card CAM from an observer looking at the package 120 from the general direction D in FIG. 3, which is the most common direction of observation, particularly during a transaction between a server and a customer in a restaurant.

Preferably, the keyboard 122 is sized to have a width which is preferably close to or only slightly larger than the standard width of the card CAM, so that the shielding function of the card is optimal.

Furthermore, in order to facilitate the insertion of the car CAM into the coupler 121, the slot 121a is preferably provided with a part of a wall 127 on the upper surface of the package 120 which is roughly perpendicular to the direction of insertion of the card and which projects slightly from this upper surface.

In a preferred but non-limiting way, the inclination of the card CAM, once it is in place, can be between approximately 45° and approximately 60° relative to the plane of the keyboard 122.

The essential functionalities of the equipment described above, as well as the sequence of a transaction, will now be described in detail.

The essential functions of the fixed part 110 of the equipment are:

to carry out verifications on blacklists, for instance, locally from a list of "prohibited" smart cards (a list which is contained in the memory of the part 100);

to execute authorization requests via the telephone or telematic network, particularly when the amount of the transaction exceeds a certain threshold;

to store the transactions conducted and, if necessary, the pieces of information relating to aborted transactions or to card inhibited operations carried out when, for example, a presumed card holder has sequentially entered three erroneous confidential codes on the keyboard 122;

to print out the transaction tickets; and to transfer a file of transactions stored in a given period (for example daily) to a central bank processing site, etc.

Each portable package 120, with its components as described, ensures:

the reading of smart cards;

their authentication, the entry of the amount of the transaction on the keyboard 122;

the presentation of the confidential code, entered by the card holder on the keyboard 122, to the card, in order to verify through the card that the code is correct, and the management of the procedure for the calculation of a certificate by the smart card, by sending a random number (based, for example, on the current date or time).

The package 120 is also capable of transmitting the following pieces of information to the fixed part 110, via an infrared link 124, 132:

the number of the card;

the amount of the transaction;

the random number furnished to the card CAM (date or time, for example), and the certificate calculated by the card CAM.

It will be observed here that the package 120 itself, due to the fact that it includes components which are light and not very bulky, is small in size and weight, and can be transported very easily by an operator, who can keep it permanently in a pocket or in his belt without risking any inconvenience.

Thus, certain disadvantages of the known pieces of equipment cited in the introduction of the present application are overcome.

Furthermore, in a particularly advantageous way, the architecture of the equipment of the present invention in three parts 100, 120 (potentially in several parts) and 130 makes it possible to adapt it to existing fixed pieces of equipment. More precisely, with a known piece of equipment which includes a fixed part including a multi-pin electrical connector for temporary physical linkage with a portable part, the linkage cable 115 of the auxiliary apparatus can be brought into connection with this connector, with no physical modification of the fixed part being necessary. In this case, the assembly constituted by the portable part 120 and the auxiliary part 130 is substituted for the old portable part.

The sequence of operations executed within the scope of a transaction will now be described in detail.

First of all, it will be stated precisely that when the equipment 100 is first turned on, an initialization procedure is triggered by the fixed part 110. Through the infrared link, the part 100 transmits the following pieces of information to each portable package 120:

the current date and time; and the identification number of the merchant in possession of the equipment, which is stored in the fixed part.

From this moment, the circuit 126 of each package 120 is able to update the hour and the date using its own software. This is preferably the time which is used as a random number for the calculation of a certificate, as will be seen later.

Furthermore, it will be noted that an initialization of a portable package 120 can be performed on demand. In order to do this, it is possible to provide for a combination of specific keys on the keyboard 122 to cause an initialization procedure, which is indicated on the display 123. The operator then enters his own identification number, with one digit for example, on the keyboard 122. The initialization, in the strict sense of the word, is then performed by bringing the package 120 to the auxiliary apparatus 130, and by pressing the "validation" key on the keyboard 122. The portable package 120 then transmits an identification number for the package 120, which is permanently stored in the package 120, and a specific initialization request code to the fixed part 10 through the infrared link. The sending of the date, the time and the merchant number to the package 120 then takes place as described above.

At the start of a transaction, a card CAM is inserted by the operator into the coupler 121 of a package 120, and then read. The operator then enters the amount of the transaction on the keyboard 122 and validates it.

The package 120 is then placed into a wait mode so that the confidential code can be entered by the card holder. The package 120 is then presented by the operator to the holder, who enters his code. The masking function fulfilled by the card during this phase has been described above. It will be noted that during the entry of this code, the card must be in the coupler 121.

After verification by the card CAM of the fact that the code is correct, the circuit 126 applies the random number to the card CAM via the coupler 121, so that the card can return a certificate, which is then stored in the read-write memory of the circuit 126.

The card CAM can then be restored to its holder, and the transaction data must then be transmitted to the fixed part 110. A corresponding message is then displayed on the display 123.

It will be observed that, in order to carry out this transmission, it may prove necessary to bring the portable package 120 to the auxiliary equipment 130 which ensures infrared reception. In that case, and according to another interesting aspect of the invention, since the smart card has previously been withdrawn from the coupler 121 and returned to its holder (for it is no longer involved in the transaction), it thus prevents any risk of abuse or fraud, inasmuch as the holder of the card, who has presented this confidential code to the package 120, keeps this card permanently in his field of vision.

The sending of the transaction data to the fixed part 110 by the package 120 is preferably triggered by pressing the "validation" key on the keyboard 122 by the operator. The pieces of information transmitted are preferably the following:

the identification number of the portable package 120;

a transaction request code, preprogrammed into the package 120 and recognized by the fixed part 110;

a transaction number, preferably obtained by reading a counter (in the form of a read-write memory) provided in the circuit 126 and incremented by one with each transaction;

the amount of the transaction, as entered;

the card number, previously read on the card;

the date and the time (random number); and the certificate previously calculated by the card.

A piece of reception acknowledgment information is then preferably transmitted by the fixed part 110 to the package 120, through the infrared link, so that the package 120 resets the part of its memory which contains the transaction parameters.

The fixed part therefore executes the operations:

of blacklist verification;

if necessary, of requesting authorization from a central site, when the amount of the transaction exceeds a certain threshold;

of printing the transaction ticket, using the conventional rubrics; and of storing the transaction in its read-write memory.

The ticket is then given to the card holder.

Advantageously, the equipment 100 is also designed to process bank cards with magnetic strips, in which case all of the operations, from the reading of the card to the delivery of the ticket, are executed in the fixed part 110.

Also preferably, the fixed part 110 is programmed so that if for one reason or another the transaction does not go through, a ticket containing information which relates to this non-completion and the reason for it will be printed. It may be due to, for example, a refused card, an inhibited card, or a voluntary abandonment of the transaction.

FIG. 6 represents an example of an embodiment of a piece of auxiliary equipment 130, which includes a receptacle for a portable package 120, so that the terminals 125a for recharging the batteries 125 come into contact with the corresponding terminals 131a provided at the base of the receiver. The infrared emitter/receiver 132 is provided in a part which forms the back wall of the apparatus 130.

FIGS. 7 and 8 show an auxiliary apparatus 130' which has the same functions, but which serves as a "self-service" stand and as a recharging means for four portable packages 120.

The apparatus 130' includes a central base 135 with a generally parallelepiped shape, which includes four lateral faces which are generally vertical. At the base of each lateral face is a plate 136 whose height is a fraction of the height of each package 120, and which is articulated on a horizontal axis A. Each plate 136 can deviate from the associated lateral wall, preferably in opposition to an elastic force, in order to allow the insertion of the base part of a vertically oriented portable package 120, as illustrated on the right side of FIG. 8. Recharging contacts (not represented) are provided in the bottom area of each cradle defined between a lateral wall and the associated plate.

In a particularly advantageous way, the infrared emitting/receiving device is housed in the area at the top of the central base 135.

Of course, the present invention is not in any way limited to the embodiments described above and represented in the drawings, but one skilled in the art will know how to carry out any variant or modification in conformity with its essence.

In particular, the pieces of information transmitted between the portable package and the fixed part can be constituted by either acoustic or electromagnetic signals, using known devices corresponding to the emitter 124a (and corresponding receptor) used to transmit data by infrared signals.

I claim:

1. A device for performing monetary transactions with a microprocessor card, the device comprising a housing including a coupler for communicating with the microprocessor card, a slot located adjacent to the coupler for receiving the microprocessor card so that, in the fully inserted position, a portion of the microprocessor card remains exposed to exterior portions of the housing, a keyboard for entering at least one confidential code associated with the microprocessor card received in the coupler, and a processor for validating the transaction, wherein the slot is disposed adjacent to a top edge of the keyboard and wherein the coupler and the slot are positioned so that the exposed portion of the microprocessor card extends at least partially over the keyboard, thereby forming a screen for preventing observers from observing the confidential code which is entered.

2. The device of claim 1 wherein the keyboard is located in a plane corresponding to an upper surface of the housing, wherein the slot is located along an edge of the keyboard, and wherein the coupler and the slot combine to receive the card so that the card forms an oblique angle with respect to the plane.

3. The device of claim 2 wherein the angle between the card and the plane of the keyboard is between about 45° and 60°.

4. The device of claim 2 wherein the slot is provided in a portion of the upper surface of the housing which is substantially perpendicular to the card projecting from the plane of the upper surface.

5. The device of claim 1 which includes a fixed part receiving at least a portion of the processor, and a portable part, wherein the housing is associated with the portable part.

6. The device of claim 5 wherein the portable part includes the coupler and the slot, the keyboard, a display, a transceiver and a rechargeable accumulator.

7. The device of claim 6 wherein the transceiver operates responsive to acoustic signals.

8. The device of claim 6 wherein the transceiver operates responsive to electromagnetic signals.

9. The device of claim 6 wherein the transceiver operates responsive to infrared signals.

10. The device of claim 5 wherein the fixed part includes the processor, means for storing the transactions, means for printing transaction tickets and means for receiving information from the portable part.

11. The device of claim 10 which further comprises a plurality of portable parts, wherein each portable part includes means for communicating with the fixed part.

12. The device of claim 11 wherein each portable part is provided with an identifier for identifying the portable part.

13. The device of claim 10 wherein the fixed part includes a transceiver for communicating with the portable part.

14. The device of claim 13 wherein the transceiver operates responsive to acoustic signals.

15. The device of claim 13 wherein the transceiver operates responsive to electromagnetic signals.

16. The device of claim 13 wherein the transceiver operates responsive to infrared signals.

17. The device of claim 13 wherein the fixed part transmits information relating to validation of a transaction associated with the card.

18. The device of claim 5 wherein the portable part includes a rechargeable accumulator and a transceiver for communicating with the fixed part, wherein the fixed part is coupled with an auxiliary unit by a cable, and wherein the auxiliary unit includes at least one receptacle for receiving the portable part and for recharging the accumulator, and a transceiver for communicating with the portable part.

19. The device of claim 18 wherein the auxiliary unit includes a plurality of receptacles for receiving a plurality of portable parts.

20. The device of claim 19 wherein the auxiliary unit includes a central base having a plurality of side faces, a transceiver associated with an upper area of each side face, and in a lower area of each side face, a hinged flat including a receptacle for recharging one of the portable parts.

21. A process for performing a transaction with a device comprising a housing including a coupler for communicating with a microprocessor card, a slot located adjacent to the coupler for receiving the microprocessor card so that, in the fully inserted position, a portion of the microprocessor card remains exposed to exterior portions of the housing, a keyboard for entering at least one confidential code associated with the microprocessor card received in the coupler, and a processor for validating the transaction, wherein the slot is disposed adjacent to a top edge of the keyboard and wherein the coupler and the slot are positioned so that the exposed portion of the microprocessor card extends at least partially over the keyboard, thereby forming a screen for preventing observers from observing the confidential code which is entered, the process comprising the steps of:

(a) introducing a microprocessor card into a card holder in the coupler of the portable part so that portions of the card overlie the keyboard of the portable part;

(b) entering a transaction amount on the keyboard of the portable part;

(c) reading from the card an identifier and a confidential code unique to the card;

(d) entering a confidential code on the keyboard of the portable part;

(e) checking the entered confidential code, and displaying the result of the checking on the display means;

(f) removing the card from the coupler;

(g) bringing the portable part to the fixed part;

(h) tranmitting data from the portable part to the fixed part using the transceiver, wherein the data is representative of the entered transaction amount and the identifier; and (i) storing the transaction in the fixed part.

22. The process of claim 21 which further comprises the step of printing a transaction ticket.

23. The process of claim 21 which further comprises, before the card removing step, the step of calculating a check sum in the card from the random number provided by the processing of the portable part, and transmitting the check sum to the fixed part.

24. The process of claim 21 which further comprises the step of transmitting to the fixed part data associated with a plurality of portable parts.

* * * * *